(12) United States Patent
Meyer et al.

(10) Patent No.: US 10,227,958 B2
(45) Date of Patent: Mar. 12, 2019

(54) PRE-FILTER SYSTEM FOR A VEHICLE

(71) Applicant: AGCO International GmbH, Hesston, KS (US)

(72) Inventors: Laurent Meyer, Beauvais (FR); Valentin Daniel Joel Leconte, Cempuis (FR); Jonas Lécuelle, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 104 days.

(21) Appl. No.: 15/406,953

(22) Filed: Jan. 16, 2017

(65) Prior Publication Data
US 2017/0204816 A1    Jul. 20, 2017

(30) Foreign Application Priority Data

Jan. 15, 2016   (EP) .................................. 16 290 013

(51) Int. Cl.
| | |
|---|---|
| *F02M 35/06* | (2006.01) |
| *B01D 45/18* | (2006.01) |
| *B01D 50/00* | (2006.01) |
| *F02M 35/16* | (2006.01) |
| *F02M 35/02* | (2006.01) |

(Continued)

(52) U.S. Cl.
CPC ............. *F02M 35/06* (2013.01); *B01D 45/18* (2013.01); *B01D 50/002* (2013.01); *F02D 41/0002* (2013.01); *F02M 35/022* (2013.01); *F02M 35/0209* (2013.01); *F02M 35/0216* (2013.01); *F02M 35/0223* (2013.01);

(Continued)

(58) Field of Classification Search
CPC .... B01D 46/00; B01D 46/0039; B01D 45/12; B01D 46/0023; F02M 35/08; F02M 35/09; F02M 35/104
USPC ................. 55/383, 385.3; 123/198 E, 41.65; 180/68.2
See application file for complete search history.

(56) References Cited

U.S. PATENT DOCUMENTS

| | | |
|---|---|---|
| 5,183,017 A | 2/1993 | Bopp et al. |
| 6,955,698 B2 | 10/2005 | Hettmann et al. |

(Continued)

FOREIGN PATENT DOCUMENTS

| | | |
|---|---|---|
| DE | 102010000969 A1 | 7/2011 |
| EP | 2313638 A1 | 4/2011 |

(Continued)

OTHER PUBLICATIONS

UK Intellectual Property Office, International Search Report for Related UK Application No. GB1602245.1, dated Jul. 13, 2016.

(Continued)

*Primary Examiner* — Duane Smith
*Assistant Examiner* — Minh Chau T Pham

(57) ABSTRACT

A pre-filter assembly for a vehicle arranged with an aspiration duct extending between the pre-filter and a fan of the vehicle. A variable valve element is provided as part of the aspiration duct adjacent the fan, such that the aspiration rate through the duct can be controlled by appropriate variation of the valve element, to control the rate of airflow drawn through the aspiration duct by the fan. This allows for aspiration rate of the pre-filter to be at least partly independent of the flow rate of the fan, without the need for an additional motor-driven blower unit.

16 Claims, 4 Drawing Sheets

(51) Int. Cl.
*F02M 35/022* (2006.01)
*F02M 35/08* (2006.01)
*F02D 41/00* (2006.01)

(52) U.S. Cl.
CPC .......... *F02M 35/08* (2013.01); *F02M 35/084* (2013.01); *F02M 35/164* (2013.01); *F02D 2200/101* (2013.01)

(56) References Cited

U.S. PATENT DOCUMENTS

| | | | | |
|---|---|---|---|---|
| 7,682,413 | B2* | 3/2010 | Sheidler | B01D 45/12 |
| | | | | 123/198 E |
| 9,222,448 | B2* | 12/2015 | Ghorpade | F02M 35/164 |
| 9,273,649 | B2* | 3/2016 | Gomez | F02M 35/09 |
| 2003/0154862 | A1 | 8/2003 | Porsche | |
| 2003/0182910 | A1* | 10/2003 | Pikesh | B01D 45/16 |
| | | | | 55/396 |
| 2008/0016833 | A1* | 1/2008 | Sheidler | B01D 46/0046 |
| | | | | 55/385.3 |
| 2010/0071978 | A1* | 3/2010 | Kisse | F02M 35/022 |
| | | | | 180/68.2 |

FOREIGN PATENT DOCUMENTS

| | | |
|---|---|---|
| EP | 2907998 A1 | 8/2015 |
| EP | 2949912 A1 | 12/2015 |
| SU | 1245740 A1 | 7/1986 |
| WO | 2015/012756 A1 | 1/2015 |

OTHER PUBLICATIONS

European Patent Office, International Search Report for European Counterpart Application No. EP17150902, dated Mar. 27, 2017.

* cited by examiner

PRE-FILTER SYSTEM FOR A VEHICLE

BACKGROUND

Field of the Invention

The present invention relates to a pre-filter or pre-cleaner system for a vehicle, and an associated vehicle.

Description of Related Art

A pre-filter or pre-cleaner is sometimes used in vehicle construction, particularly in agricultural vehicles, for the provision of particle-free air for the intake of an engine.

Atmospheric air generally comprises an amount of dust, dirt and other debris particles suspended in the air. Known pre-filter designs are arranged to draw in such particle-laden air through shaped louvers or vanes which act to impart a centrifugal effect to the air flow. The relatively heavy particles are accordingly separated from the air flow by the centrifugal effect, such that the relatively clean air may be supplied to the engine intake, after passing through any additional filters as required.

The separated particles may be collected in the pre-filter, before exiting the pre-filter through an aspiration duct or scavenging line. A negative pressure or suction is provided in the aspiration duct to aid in the removal of the particles from the pre-filter. Such suction is normally provided by connecting one end of the aspiration duct to the suction side of an engine fan.

However, as a vehicle engine fan sometimes operates at a reduced speed, e.g. when the engine is not running or is operating at a low speed, accordingly the suction of the aspiration duct provided by the engine fan is also reduced, resulting in a reduction in the efficiency of the pre-filter particle removal.

U.S. Pat. No. 3,469,566 describes a system wherein an additional motor-driven blower is provided as part of a pre-filter system, to ensure that the suction rate of the aspiration duct can be controlled independently of the speed of the engine fan. However, such a solution requires the use of additional mechanical components, resulting in increased cost as well as increased service requirements.

It is an object of the invention to provide a pre-filter system for a vehicle that provides for consistent pre-filter operation, without requiring additional mechanical blower devices.

BRIEF SUMMARY OF THE INVENTION

Accordingly, there is provided a pre-filter assembly comprising an air pre-filter arranged to separate particles from an air flow, and an aspiration duct for the removal of separated particles from the air pre-filter, the aspiration duct having a first end at the air pre-filter and a second end to be arranged at an area of low-pressure flow for generating suction in the aspiration duct, wherein the pre-filter assembly further comprises a controllable valve element coupled with said aspiration duct, the controllable valve element preferably in the form of an adjustable nozzle, said valve element being adjustable to vary the suction effect generated in the aspiration duct.

Through control of the valve element, accordingly the suction rate of the aspiration duct can be adjusted independently of the rotational speed of an associated fan, without the need for additional suction devices. In cases where the associated fan is rotating at a relatively low speed, the valve element may be adjusted such that a greater proportion of air flow drawn by the fan is drawn through the aspiration duct, thereby providing for a relatively increased aspiration flow rate. Similarly, in cases where the associated fan is rotating at a relatively high speed, the valve element may be adjusted such that a smaller proportion of air flow drawn by the fan is drawn through the aspiration duct, thereby providing for a relatively reduced aspiration flow rate. The valve element may be moveable relative to the associated fan, to adjust the amount of suction provided by the fan to the aspiration duct. Preferably, the valve element is controlled to maintain a substantially constant aspiration flow rate, independent of the rotational speed of the associated fan.

In a preferred embodiment, the second end of the aspiration duct is arranged at an upstream side of a fan for generating suction in the aspiration duct. Alternatively, it will be understood that the second end of the aspiration duct can be arranged at any other suitable location exposed to low pressure flow which is suitable to generate suction in the aspiration duct, e.g. at an exhaust gas outlet.

Preferably, the valve element is located at the second end of the aspiration duct, wherein the valve element comprises an aperture open to the associated fan.

In one aspect, the valve element comprises a translationally moveable air scoop, wherein the air scoop is moveable relative to the flow path through the swept area of an associated fan.

In an additional or alternative aspect, the valve element comprises a hinged or pivoted air scoop, wherein the air scoop is moveable relative to the flow path through the swept area of an associated fan.

As the air scoop can be moveable relative to the flow path through the fan, e.g. moved into or out of the fan flow path, accordingly a greater or lesser flow of air may be drawn by the fan through the aspiration duct, allowing for adjustment of the suction rate in the aspiration duct.

In an additional or alternative aspect, the valve element comprises an aperture open to the associated fan, wherein the valve element is configured such that the aperture size of the valve element may be adjustable.

In an additional or alternative aspect, the valve element comprises a hinged flap or baffle which is moveable relative to the flow path of the fan, the hinged flap or baffle arranged to increase or decrease the effective area of the aperture open to the associated fan.

By varying the aperture size of the valve element, the flow rate in the aspiration duct can be varied separate to the rotational speed of the associated fan. For embodiments having an air scoop as part of the valve element, appropriate adjustment of air scoop dimensions provide for an air scoop having increased intake or outflow area.

In a further aspect, the aperture of the valve element may be adjusted to close the valve element, thereby sealing the aspiration duct. Such a configuration may be used to prevent reverse flow in the aspiration duct, e.g. if the associated fan is operated in a reverse direction or is generating a reversed air flow.

There is further provided a vehicle, preferably an agricultural tractor, comprising a pre-filter assembly as described above, further comprising at least one fan, wherein the valve element of the pre-filter assembly is arranged at the suction side of said fan to generate suction in the aspiration duct.

The valve element can be positioned at the suction side or upstream of the fan, such that a portion of the suction effect generated by the operation of the fan acts to draw separated particles from the pre-filter through the aspiration duct for eventual disposal. The aspiration duct and/or valve element may be mounted in or integral with a duct or cowling arranged about the fan. Furthermore, the valve element may be positioned between the fan and an associated heat exchanger assembly.

Preferably, said fan comprises an engine cooling fan of said vehicle.

Preferably, the valve element is controlled to maintain a constant suction rate in the aspiration duct. This control of the suction rate may be performed substantially independently of the rotational speed of the fan.

Preferably, the vehicle further comprises an electronic control unit (ECU) arranged to control the valve element, wherein the ECU is arranged to adjust the valve element to control the suction rate in the aspiration duct.

In one aspect, the ECU can adjust the valve element to maintain a substantially constant suction rate in the aspiration duct.

In suitable conditions, the ECU can monitor the suction rate, and control the valve to maintain a pre-defined or preferred suction rate, e.g. through closed loop control.

Additionally or alternatively, the ECU can adjust the valve element to provide adaptive control of the suction rate in the aspiration duct.

For example, for high engine speed, the pre-filter operates at a relatively high level of efficiency due to increased airflow through the pre-filter, which reduces the importance of the suction rate from the pre-filter. However, in such situations the engine cooling rate is of increased importance. Accordingly, the valve may be controlled to reduce the suction rate in the aspiration duct, to reduce any disturbance to the cooling flow through the fan.

Similarly, during periods of low engine speed, engine cooling is not a limiting factor while a relatively high scavenge flow is required from the pre-filter. Accordingly, the valve may be controlled to increase the suction rate in the aspiration duct, as disturbance of the fan does not result in a significant impact on performance.

In one aspect, the ECU is operable to control the valve element responsive to the rotational speed of the vehicle fan and/or the vehicle engine speed.

In an additional or alternative aspect, the vehicle further comprises at least one pressure sensor or flow sensor provided in said aspiration duct and arranged to provide an indication of pressure or flow levels in the aspiration duct, wherein the ECU is operable to control the valve element based on the output of the at least one pressure sensor or flow sensor.

If the ECU detects a rise in the pressure level in the aspiration duct or a fall in the flow rate through the aspiration duct, which may be indicative of a blockage in the duct, the ECU may control the valve element to increase the suction rate through the duct.

In an additional or alternative aspect, the vehicle further comprises a sensor arranged to monitor particle levels in air flow through the pre-filter, wherein the ECU is operable to control the valve element based on the output of the particle level sensor.

If the ECU detects that the pre-filter airflow has an increased particle level, the ECU may control the valve element to increase the suction rate through the duct to account for the extra amount of particles to be extracted from the pre-filter.

BRIEF DESCRIPTION OF THE DRAWINGS

Embodiments of the invention will now be described, by way of example only, with reference to the accompanying drawings, in which.

It will be understood that the drawings are provided as illustrative schematics, and are not provided to scale.

DETAILED DESCRIPTION OF THE INVENTION

Figure 1:
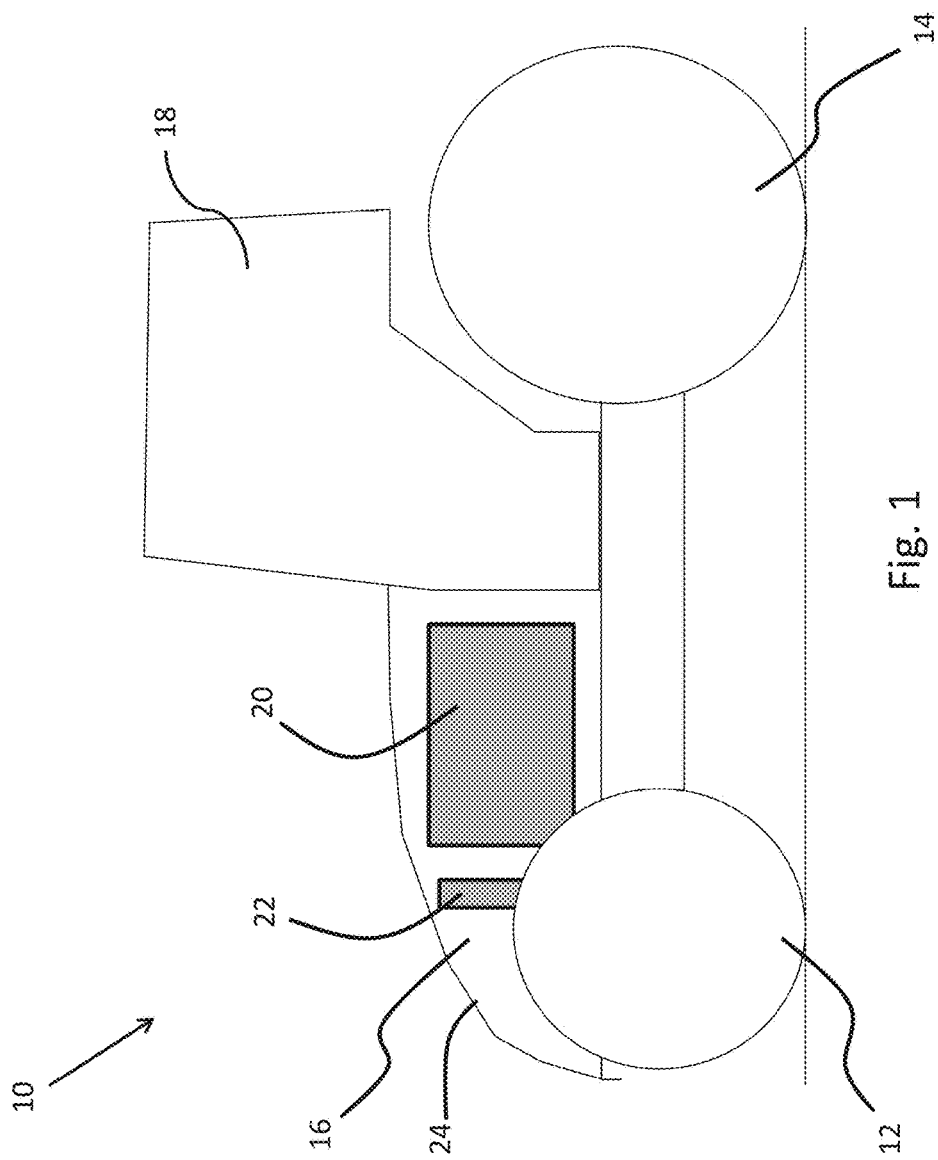
FIG. 1 is a plan view of an agricultural tractor according to the invention.

In FIG. 1, a vehicle in the form of an agricultural tractor is indicated at 10. The tractor 10 comprises front wheels 12, rear wheels 14, an engine section 16 and a cab section 18. An engine 20 is provided in the engine section 16, with a cooling package 22 located adjacent the engine 20. The tractor 10 comprises an Engine Control Unit (ECU, not shown), which is configured to control the operation of the engine 20 of the tractor 10, as well as any additional vehicle systems, based on input received from the tractor operation and/or any tractor sensor systems.

Figure 2:
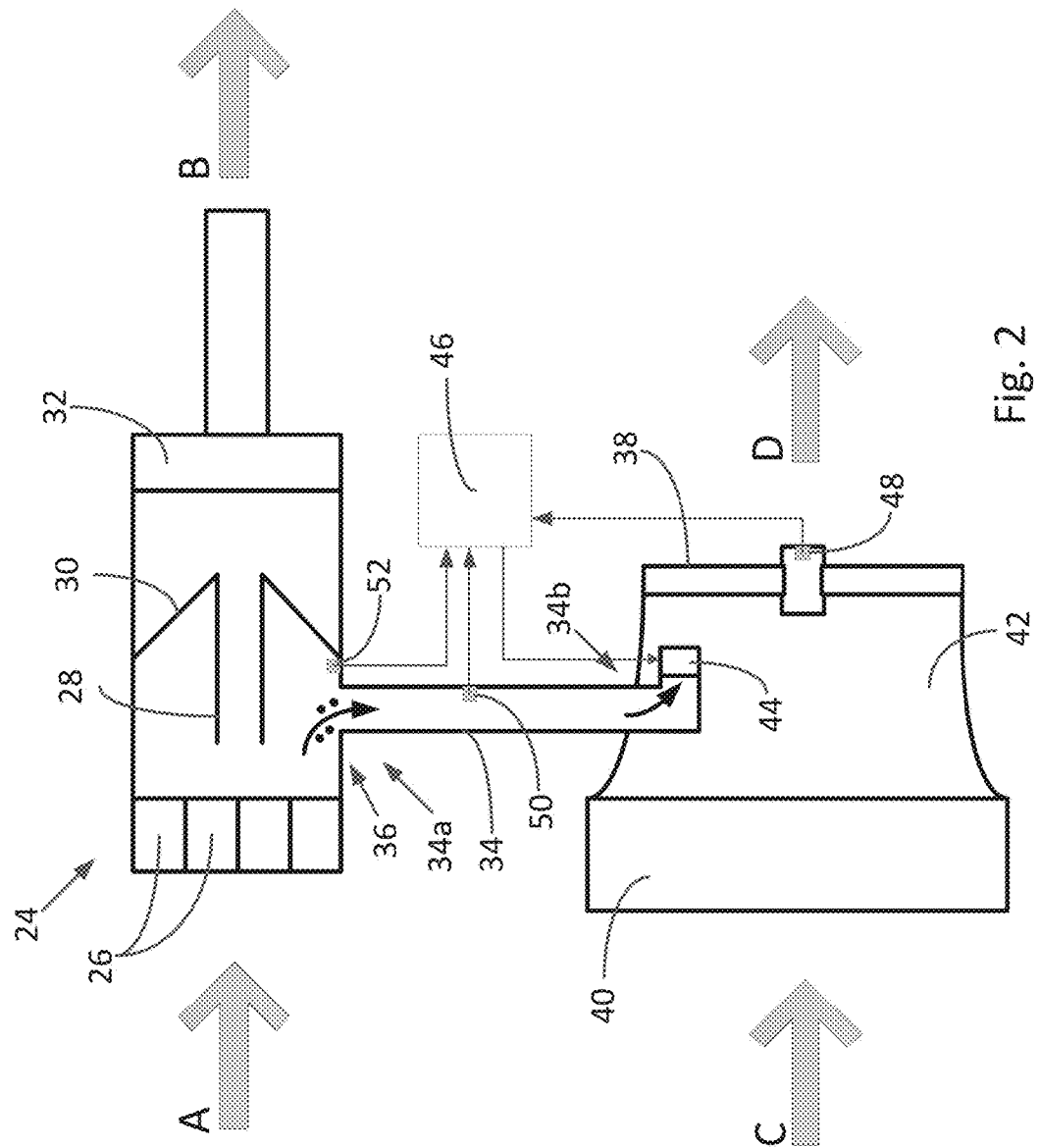
FIG. 2 is a schematic drawing of a pre-filter assembly according to the invention.

With reference to FIG. 2, an overview of a pre-filter assembly according to the invention is provided. The pre-filter assembly comprises a pre-filter or pre-cleaner 24, which may be arranged adjacent to the cooling package 22 of the tractor 10. The pre-filter 24 is arranged to receive an intake of atmospheric air, indicated by arrow A. The airflow A typically comprises a plurality of suspended particles, e.g. dust, dirt, or other debris. The pre-filter 24 comprises an array of vortex-inducing elements 26, which are configured to impart a swirling action to the incoming air A. The vortex-inducing elements 26 may comprise any suitable combination of louvers, vanes, baffles, etc., which are arranged to generate a cyclonic action on the airflow though the pre-filter 24.

As the airflow experiences the cyclonic twisting action, the relatively heavy suspended particles are forced radially outward due to the centrifugal effect of the twisted airflow. The pre-filter comprises at least one central tubular aperture 28 surrounded by a barrier 30 forming a debris trap arranged downstream of the array of vortex-inducing elements 26, such that while the airflow continues through the aperture 28, the outwardly-forced particles are prevented from passing any further due to the presence of the debris trap 30. The now-cleaned airflow, indicated by arrow B, is then suitable for provision to the air intake of the engine 20. The pre-filter 24 of FIG. 2 further comprises an additional filter element 32 arranged downstream of the aperture 28 and debris trap 30, to provide for additional cleaning of the intake airflow B.

The pre-filter assembly further comprises an aspiration duct or scavenger line 34, the aspiration duct 34 having a first end 34a arranged at the pre-filter 24 between the vortex-inducing elements 26 and the debris trap 30. The particles 36 which are separated from the airflow A are collected at the debris trap 30, and are extracted from the pre-filter 24 via the aspiration duct 34.

The tractor comprises a cooling fan 38, which is arranged to draw in air (indicated by arrow C) which passes through at least one heat exchanger device 40, and to direct air (indicated by arrow D) over the tractor engine (20, FIG. 1).

A duct or cowling 42 may extend between the heat exchanger device 40 and the cooling fan 38 to provide a defined flow path for airflow through the fan 39.

The second end 34b of the aspiration duct 34 is arranged adjacent the cooling fan 38 of the tractor 10, at the suction side of the fan 38. As a result, the operation of the fan 38 to draw air in the direction of arrow D acts to generate suction in the aspiration duct 34, thereby aiding in the removal of the separated particles 36 from the pre-filter 24. The suction rate or aspiration rate of the aspiration duct 34 is dependent on the rotational speed of the cooling fan 38. While the illustrated embodiment relies on the airflow generated by the engine cooling fan 38 to generate suction in the aspiration duct 34 and an associated airflow in the duct, it will be understood that the second end 34b of the aspiration duct 34 may be located at any position having low pressure flow to generate suction in the aspiration duct 34, for example at an exhaust gas outlet, wherein the flow of exhaust gas acts to generate a suction flow in the duct 34.

The pre-filter assembly further comprises a valve element 44 arranged at the second end 34b of the aspiration duct 34. The valve element 44 is controllable, such that the suction rate or aspiration rate of the aspiration duct 34 may be adjusted independently of the rotational speed of the cooling fan 38. The valve element 44 is adjustable such that a greater or lesser proportion of airflow through the fan 38 can be provided via the aspiration duct 34, with the result that the aspiration rate through the duct 34 may be adjusted or maintained at a substantially constant rate, independent of the rotational speed of the fan 38. Preferably, the valve element 44 is in the form of an adjustable nozzle. The nozzle is arranged to be open to the upstream side of the fan 38.

For example, as the fan 38 may occasionally operate at a relatively low rotational speed, e.g. during periods of time when the vehicle engine 20 is idling or is turned off, accordingly the total airflow drawn through the fan 38 may decrease. During such periods of time, by adjusting the valve element 44 such that a greater proportion of airflow to the fan is provided via the aspiration duct 34, the aspiration rate through the duct 34 can be maintained at a substantially constant level, thereby ensuring the effectiveness of the pre-filter 24.

The operation of the valve element 44 is controlled by an Electronic Control Unit (ECU) 46. The ECU 46 is arranged to adjust the valve element 44, preferably to ensure a substantially constant aspiration rate in the duct 34. The ECU 46 may receive inputs from vehicle sensor systems, wherein the control of the valve element 44 is based on such received inputs.

In one aspect, the ECU 46 is arranged to receive information from a fan sensor 48, which provides an indication of the rotational speed of the fan 38. In such a configuration, the ECU 46 can be configured to increase the proportion of airflow from the aspiration duct 34 through the fan 38, when the fan 38 operates at a reduced speed, to ensure that the airflow in the aspiration duct 38 is maintained at an effective level to extract particles from the pre-filter 24. Similarly, when the fan 38 is detected as operating at a relatively high speed, the ECU 46 can be configured to reduce the proportion of airflow from the aspiration duct 34 through the fan 38.

In a further aspect, the ECU 46 is arranged to receive information from a sensor 50 provided in the aspiration duct 34. Such a duct sensor 50 may comprise a pressure sensor or a flow sensor, which provides an indication of the air pressure or the airflow rate in the duct 34. In this case, the ECU 46 is configured to adjust the valve element 44 to control airflow in the duct 34, such that the air pressure or the airflow rate in the duct 34 can be substantially maintained about a predefined setpoint, as required.

In a further aspect, the ECU 46 is arranged to receive information from a sensor 52 provided in the pre-filter 24. The pre-filter sensor 52 may operate to detect the level of particles 36 in the airflow through the pre-filter 24, wherein the ECU 46 can control the aspiration rate through the duct 34 in response to an increase or decrease in detected particle level, thereby increasing or reducing the aspiration rate through the duct 34 to adequately remove particles from the pre-filter 24.

Additionally or alternatively, the ECU 46 may be configured to control the valve element 44 in response to any other inputs, e.g. based on the engine speed of the vehicle, based on a user throttle command, etc. In a further aspect, the ECU 46 may be configured to control the valve element 44 to substantially close the second end 34b of the aspiration duct 34, or to completely seal off the duct 34 from the fan 38. Such an operation may be performed when it is desired to reduce disturbance to the fan 38 when a high suction level in the aspiration duct is not needed, and/or if the fan 38 is to be operated in a reverse flow configuration, e.g. to perform a blow-out or cleaning operation of vehicle grilles, heat exchangers, etc. In such a case, by closing off the duct 34, a reverse pressure or blowing action is prevented from reaching the air pre-filter 24 through the duct 34.

With reference to FIGS. 3-6, examples of different embodiments of valve element 44 are illustrated. It will be understood that the valve element 44 may comprise any combination of the features shown in the different embodiments.

Figure 3:
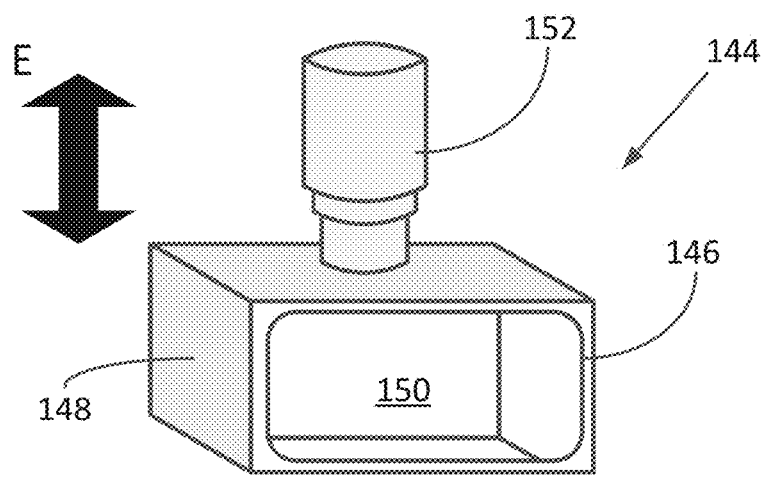
FIG. 3 is a perspective view of an embodiment of valve element of the pre-filter assembly of FIG. 2.

In FIG. 3, a first embodiment of valve element is indicated at 144. The valve element 144 comprises an air scoop 146 having a housing 148 and an aperture 150 defined therein. The air scoop 146 is fluidly coupled with the aspiration duct 34 via telescopic connection 152, wherein the air scoop 146 may be translationally moveable along at least one axis, as indicated by arrow E. The valve element 144 is arranged wherein the aperture 150 faces the vehicle fan 38, such that the valve element 144 can be controlled where the aperture 150 is positioned more or less centrally relative to the airflow through the fan 38. By moving the air scoop 146 to be more centrally located in the fan airflow, accordingly the suction rate through the connected aspiration duct 34 from the fan 38 is increased. Conversely, by moving the air scoop 146 to be less centrally located in the fan airflow, or even removed from the path of the airflow through the fan, accordingly the suction rate through the connected aspiration duct 34 via the fan 38 is decreased.

Figure 4:
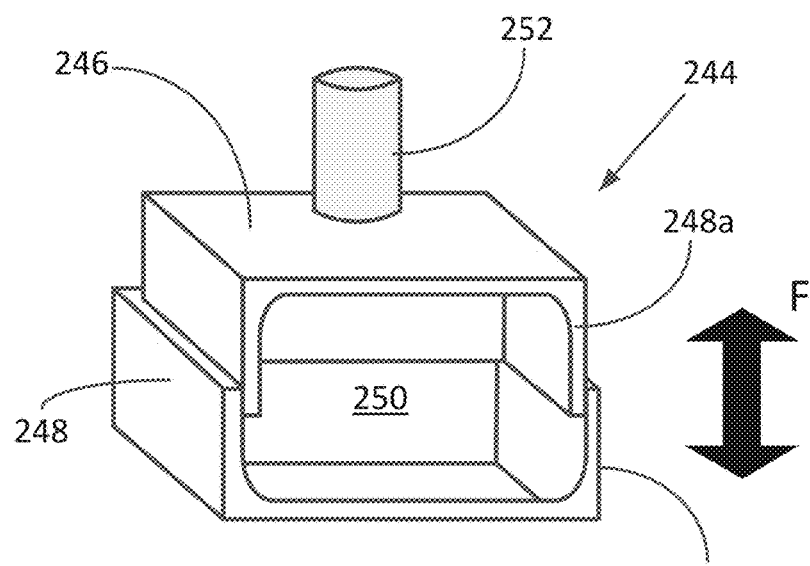
FIG. 4 is a perspective view of a further embodiment of valve element of the pre-filter assembly of FIG. 2.

In. FIG. 4, a second embodiment of valve element is indicated at 244. The valve element 244 comprises an air scoop 246 having a housing 248 and an aperture 250 defined therein. The air scoop 246 is fluidly connected with the aspiration duct 34 via tubular connection 252. The housing 248 is formed of two complimentary sections 248a,248b which form upper and lower sections of the housing 248. The upper section 248a is at least partially receivable within the lower section 248b, the lower section 248b moveable relative to the upper section 248a to provide for an adjustable size of the aperture 250. The aperture 250 is positioned upstream of the vehicle fan 38, such that the appropriate control of the size of the aperture 250 of the valve element 244 provides for a variation in the flow of air in the aspiration duct via the fan 38, thereby acting to adjust the aspiration rate in the duct 34.

Figure 5:
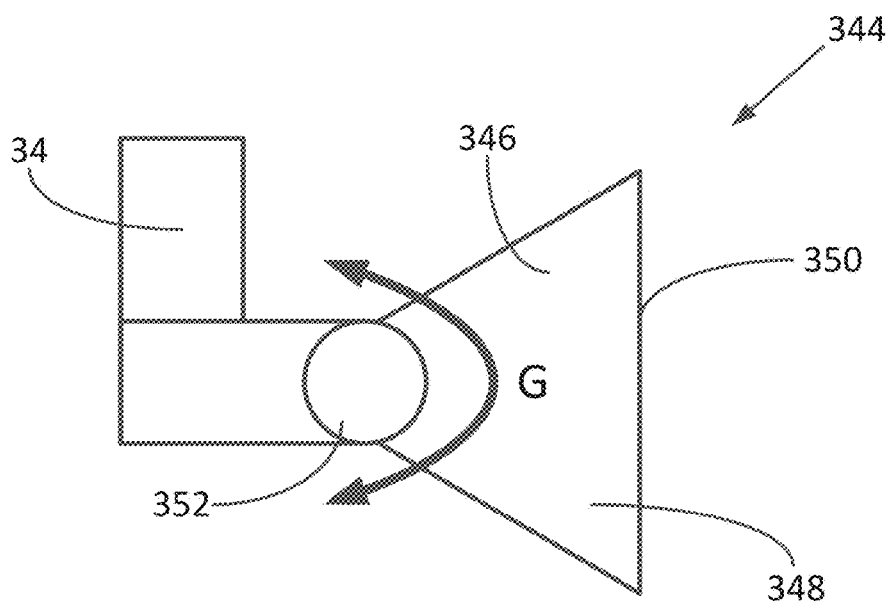
FIG. 5 is a side plan view of a further embodiment of valve element of the pre-filter assembly of FIG. 2.

In FIG. 5, a side view of a third embodiment of valve element is indicated at 344. The valve element 344 comprises an air scoop 346 having a housing 348 defining an aperture 350 to be arranged facing the upstream side of fan 38. The air scoop 346 is fluidly connected to the aspiration duct 34 via a hinge connection 352, allowing for the hinging of the air scoop 346 in the direction of arrow G. Accordingly, the aperture 350 of the air scoop 346 may be hinged into and out of the air flow path through the fan 38, thereby adjusting the amount of airflow through the aspiration duct 34 from the fan 38.

Figure 6:
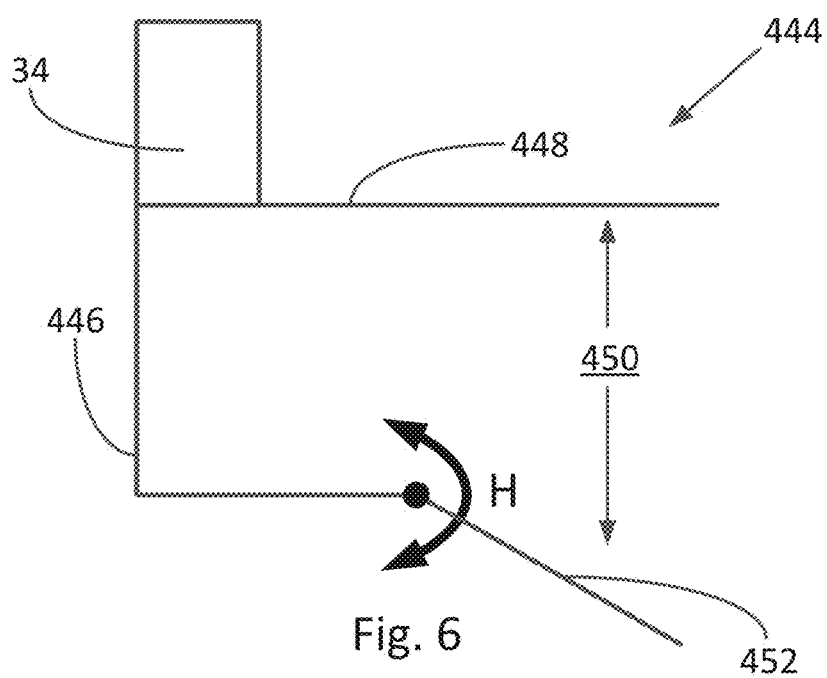
FIG. 6 is a side cross-sectional view of a further embodiment of valve element of the pre-filter assembly of FIG. 2.

In FIG. 6, a further embodiment of valve element is indicated in cross-section at 444. The valve element 444 comprises an air scoop 446 having a housing 448, the air scoop 446 fluidly connected to the aspiration duct 34. The air scoop 446 further comprises a hinged member 452, which is hingedly connected to the housing 448 and arranged to hinge in the direction of arrow H. The air scoop 446 comprises an aperture 450 defined by the housing 448 and the hinged member 452, the aperture 450 arranged facing the upstream side of fan 38. By controlling the degree of hinging of the member 452, the size of the aperture 450 may be adjusted, to thereby control the amount of airflow drawn from the aspiration duct 34 by the fan 38. In addition, the hinged member 452 may be configured to close the aperture 452, to seal off the aspiration duct 34 from the fan airflow.

It will be understood that the pre-filter assembly may comprise any suitable actuators or piezo-electric elements arranged to control the movement of the valve element components, to provide for control of the suction rate in the aspiration duct 34. In addition, it will be understood that other constructions of valve elements may be used which can be adjusted using appropriate control, such that the position, direction, and/or dimensions of an appropriate air scoop aperture may be varied to provide for control of the suction rate of the aspiration duct 34. It will be understood that while the fan 38 of FIG. 2 is the engine cooling fan of the tractor 10, it will be understood that any suitable fan device provided on the vehicle may be used for this purpose.

The use of an adjustable valve element in the aspiration duct allows for adjustment of the aspiration rate through the duct by appropriate variation of the valve element, to control the rate of airflow drawn through the aspiration duct by the fan. This allows for the aspiration rate of the pre-filter to be controlled at least partly independently of the flow rate of the fan, without the need for an additional motor-driven blower unit.

The invention is not limited to the embodiments described herein, and may be modified or adapted without departing from the scope of the present invention.

The invention claimed is:

1. A pre-filter assembly comprising:
an air pre-filter arranged to separate particles from an air flow; and
an aspiration duct for the removal of separated particles from the air pre-filter, the aspiration duct having a first end at the air pre-filter and a second end to be arranged at an area of low-pressure flow for generating suction in the aspiration duct;
wherein the pre-filter assembly further comprises a controllable valve element coupled at the second end of said aspiration duct, said valve element being controllably adjustable to vary the suction effect generated in the aspiration duct, and wherein the valve element comprises a movable air scoop having an aperture open to the area of low-pressure flow, said air scoop being movable relative to an airflow path through the area of low-pressure flow.

2. The pre-filter assembly of claim 1, wherein the second end of the aspiration duct is arranged at an upstream side of a fan for generating the suction in the aspiration duct.

3. The pre-filter assembly of claim 1, wherein the aperture of the valve element is adjustable to close the valve element, thereby sealing the aspiration duct.

4. The pre-filter assembly of claim 1, wherein the valve element is hinged to the aspiration duct so as to allow movement of the air scoop.

5. The pre-filter assembly of claim 1, wherein the air scoop is configured such that the aperture size of the air scoop is adjustable.

6. The pre-filter assembly of claim 5, wherein the air scoop comprises a hinged flap arranged to increase or decrease the effective area of the aperture open to the area of low-pressure flow.

7. The pre-filter assembly of claim 1, wherein the valve element is an adjustable nozzle.

8. An agricultural vehicle, comprising a pre-filter assembly as claimed in claim 1, the vehicle further comprising at least one fan, wherein the valve element of the pre-filter assembly is arranged at the suction side of said at least one fan to generate suction in the aspiration duct.

9. The vehicle of claim 8, wherein said at least one fan comprises an engine cooling fan of said vehicle.

10. The vehicle of claim 8, wherein the valve element is controlled to maintain a constant suction rate in the aspiration duct, or an adaptive suction rate based on an engine speed of the vehicle.

11. The vehicle of claim 8, wherein the vehicle further comprises an electronic control unit (ECU) configured to control the valve element, wherein the ECU is configured to adjust the valve element to control the suction rate in the aspiration duct.

12. The vehicle of claim 11, wherein the ECU is configured to control the valve element responsive to at least one of a rotational speed of the at least one fan and the engine speed of the vehicle.

13. The vehicle of claim 11, wherein the vehicle further comprises at least one pressure sensor and flow sensor provided in said aspiration duct and arranged to provide an indication of at least one of pressure and flow levels in the aspiration duct, wherein the ECU is configured to control the valve element based on the output of the at least one pressure sensor and flow sensor.

14. The vehicle of claim 11, wherein the vehicle further comprises a particle level sensor configured to monitor particle levels in air flow through the pre-filter, wherein the ECU is configured to control the valve element based on an output of the particle level sensor.

15. The pre-filter assembly of claim 1, wherein the air scoop is translationally movable.

16. The pre-filter assembly of claim 14, wherein the air scoop is translationally movable by means of a telescopic connection to the aspiration duct.

* * * * *